R. D. WHITE.
RECORDING SPEEDOMETER.
APPLICATION FILED NOV. 12, 1910.
1,006,326.
Patented Oct. 17, 1911.
3 SHEETS—SHEET 1.
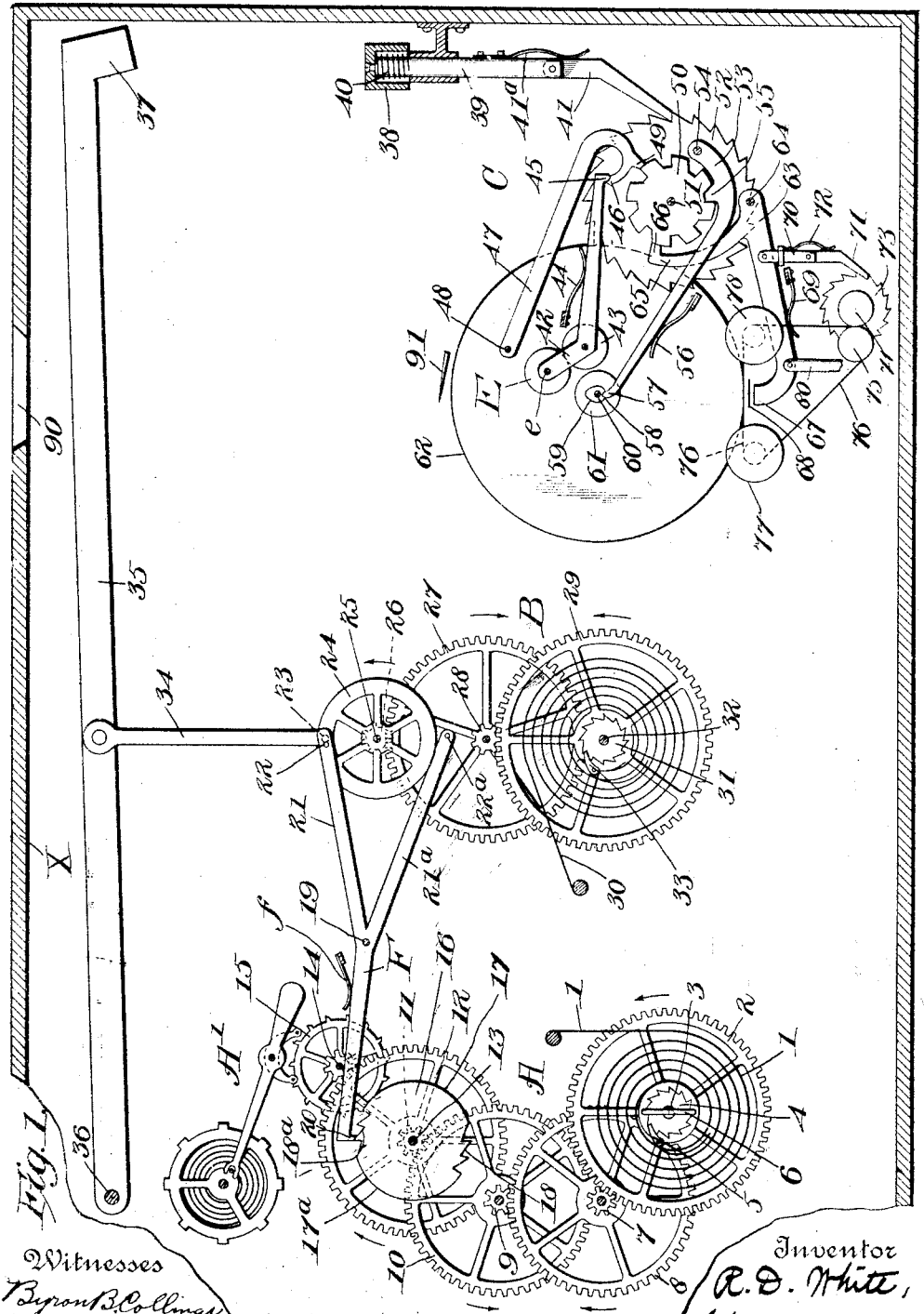

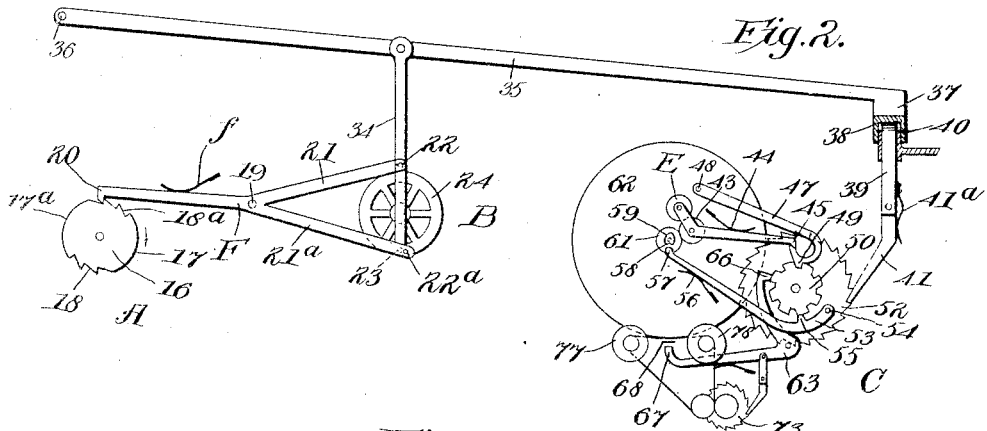
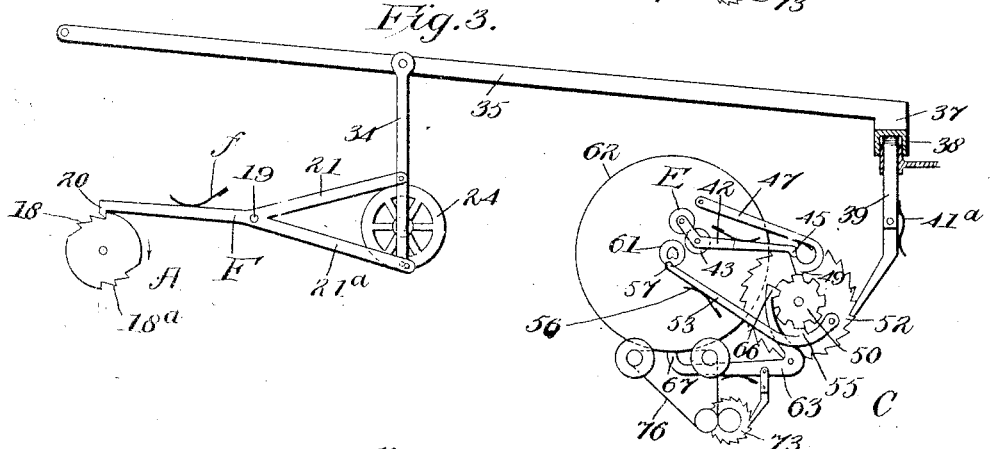
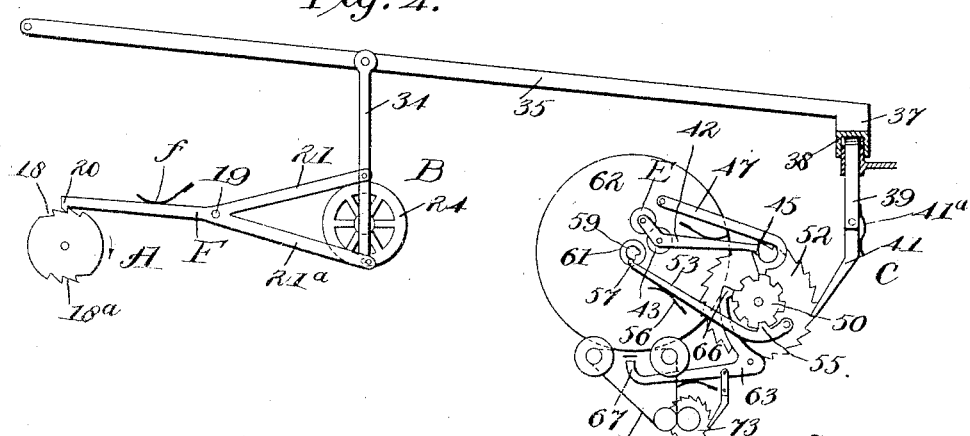

R. D. WHITE.
RECORDING SPEEDOMETER.
APPLICATION FILED NOV. 12, 1910.
1,006,326.
Patented Oct. 17, 1911.
3 SHEETS—SHEET 3.
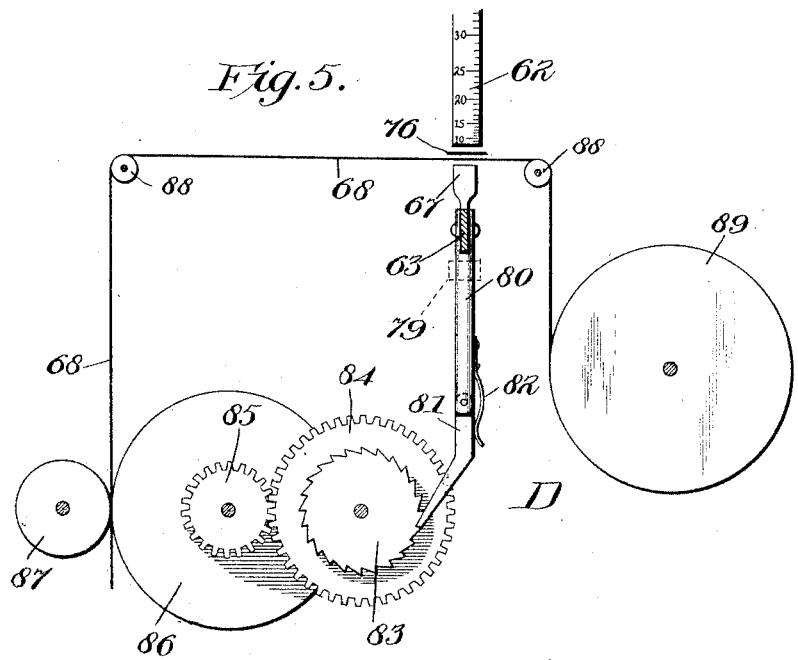
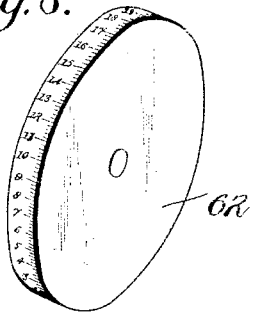
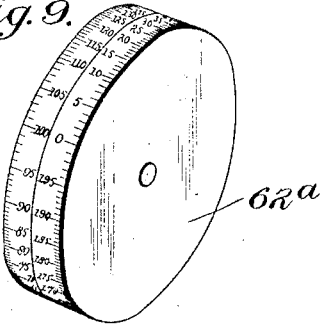
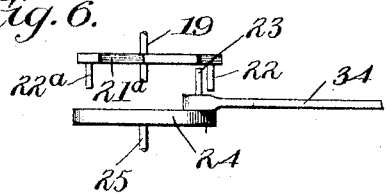
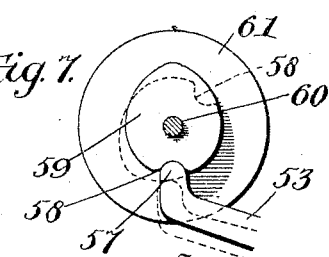
Witnesses
Byron B. Collings
Edwin J. Beller
Inventor
R. D. White
by Wilkinson, Fisher & Witherspoon
Attorney

UNITED STATES PATENT OFFICE.

RICHARD DRACE WHITE, OF THE UNITED STATES NAVY.

RECORDING-SPEEDOMETER.

1,006,326.   Specification of Letters Patent.   Patented Oct. 17, 1911.

Application filed November 12, 1910. Serial No. 592,106.

*To all whom it may concern:*

Be it known that I, RICHARD DRACE WHITE, lieutenant, United States Navy, and a citizen of the United States, stationed on board the U. S. S. *Connecticut*, at present at New York city, New York, have invented certain new and useful Improvements in Recording - Speedometers; and I do hereby declare the following to be a full, clear, and exact description of the invention, such as will enable others skilled in the art to which it appertains to make and use the same.

My present invention relates to improvements in apparatus for measuring and recording the speed at which objects move; for example, the speed in revolutions per minute of a moving engine; the speed over the ground in miles per hour of an automobile; the strokes per minute of a pump, etc. This is accomplished by measuring the speed in question for a certain interval of time and referring this increment to a scale dependent on the prearranged interval of time used, which scale will read the speed according to the standard desired.

Reference is had to the accompanying drawings in which the same parts are indicated by the same letters and numerals throughout the several views.

Figure 1 is a diagram showing the complete apparatus except the tape feed; Figs. 2, 3 and 4 are diagrams showing the various positions of the apparatus when in operation; Fig. 5 shows the tape feed; Fig. 6 is a detail view showing the engagement of the tripping lever with the stop wheel; Fig. 7 is a detail view showing the cam engagement of the stop mechanism; Fig. 8 shows one form of printing wheel; and Fig. 9 shows a modified form of printing wheel.

A represents clock work mechanism mounted in a suitable casing X driven by a main spring in the usual way and controlled by the escapement A'.

B represents the arrangement controlling the striking bar which actuates the stop and the printing mechanism.

C represents the printing mechanism, D represents the tape feed, and E represents the driving wheel, which is connected to or rotated by the shaft whose velocity is to be measured. The parts A and A' are generally similar to the hand operating mechanism of a clock and comprises a main spring 1, a gear wheel 2, a ratchet wheel 4 mounted on the shaft 3, a pawl 5 to engage the ratchet wheel, and a handle 6 to wind up the spring. The gear 2 meshes in the pinion 7 on the same shaft with the gear 8, which in turn meshes with the pinion 9 on the same shaft with the gear 10, which latter meshes in the pinion 11 on the same shaft 13 with the gear 12 and the tripping wheel 16. The speed of the train of gearing is regulated by the escapement A', pinion 14, escapement wheel 15 and the other parts which are well known in clock maker's art.

The tripping wheel 16 has plane surfaces 17 and 17$^a$, oppositely disposed and preferably extending through the larger portion of the circumference of the wheel. Between these plane portions are toothed segments 18 and 18$^a$. I have shown two plane portions. This number may be varied at will, but must always be of like angular dimension, and be separated by three notches.

The tripping lever F is pivoted at 19 and has a hook 20 at one end adapted to engage the notches 18 and 18$^a$ of the tripping wheel 16. The other end of the lever is bifurcated as at 21 and 21$^a$ and is provided with projecting pins 22 and 22$^a$, adapted to engage with the pin 23 projecting from the wheel 24, which wheel is mounted on a shaft 25 carrying the pinion 26, engaging in the gear 27 which rotates with the pinion 28, said pinion being driven by the gear 29 and spring 30. This gear 29 is mounted on the same shaft 32 with the ratchet wheel 31 and the ratchet wheel is held against turning by means of the pawl 33. This spring 30 is wound up by a handle such as that shown at 6, in the time mechanism A.

The parts 24 to 33 comprising the striking mechanism, are generally similar to the striking mechanism of a clock. The link 34 is pivoted to the wheel 24 and is also pivoted to the striking arm 35, which is pivoted at 36, and carries at its opposite end a hammer 37. This hammer 37 is adapted to strike the cap 38 on the plunger 39, which is normally held in the initial position by the spring 40, which plunger 39 has pivoted to the lower end thereof an arm 41 normally held in engagement with the ratchet 52, by means of the spring 41$^a$.

E represents the drive wheel, preferably a friction wheel, journaled on the shaft *e*, which is connected to the rotating member whose speed is to be noted in any convenient way. Journaled on the shaft *e* is the arm or bracket 42, carrying the wheel 43, preferably a friction wheel, which is constantly driven by the wheel E. The other end of this arm 42 is provided with a catch 45 normally pressed into engagement with the hook 46 by means of the spring 44. This hook 46 is at the end of the bent arm 47, pivoted at 48, and provided with a tooth 49 engaging in the toothed wheel 50, which is mounted on the shaft 51, to which is rigidly attached the ratchet wheel 52. The arm 53 is pivoted at 54 and is provided with a tooth 55 engaging said wheel 50, and also with a catch 57 engaging in the notch 58 of the heart-shaped cam 59 mounted on the shaft 60, to which shaft is rigidly attached a friction gear 61 and the printing wheel 62. The bell crank 63 is pivoted at 64 and one of its arms 65 carries a tooth 66, adapted to engage in the toothed wheel 50, while the other arm of said bell crank is provided with a hammer 67 adapted to strike the tape 68 and press the same against the carbon 76, and the printing wheel 62, which carbon passes over the spools 77 and 78, and over the friction disk 75 driven by the friction disk 74 on the same shaft with the ratchet wheel 73 driven by the wheel 73, driven by the arm 71, pivoted to the bar 70 and held in engagement with said wheel 73 by the spring 72. This arm 70 is pivoted to the bell crank 63 and the said bell crank is pressed upon by the spring 69 tending to throw the tooth 66 into engagement with the wheel 50.

The face of the printing wheel 62 is graduated with numerals and other graduations, as shown in Fig. 8; or double numerals indicating the one to be operated by the printing mechanism and the other to be read may be used, as shown in Fig. 9.

The tape is fed to the apparatus in any convenient way, as for instance, by the arrangement shown in Fig. 5, where 89 represents the spool carrying the tape 68, which tape passes over the guide rollers 88 and down between the friction rollers 87 and 86. The friction roller 86 is rotated by means of the arm 81, pivoted to the rod 80 and held in engagement with the ratchet wheel 83 by the spring 82, the said rod passing through a suitable guide 79, shown in dotted line in Fig. 5. This rod is pivoted to the bell crank 63, as shown in Figs. 1 and 5. The ratchet wheel 83 on the same shaft with the gear 84 meshes with the pinion 85, driving the friction wheel 86.

The operation of the device is as follows: Assuming the parts to be in the position shown in Fig. 1, and the springs 1 and 30 being wound up and the wheel E being connected to the shaft whose rotation is to be measured, the train of gearing A will be operated and the tripping wheel 16 driven at a uniform speed. The spring 30 will tend to operate the train of gearing B, but the pin 22 on the tripping lever F will engage the pin 23 on the wheel 24 whenever the catch 20 is clear of any of the notches on the tripping wheel 16. This will occur when the catch 20 bears on either segment 17 or 17ᵃ of the wheel 16, or is wedged on to the top of the teeth 18 or 18ᵃ, as shown in Fig. 1. As this wheel 16 rotates, the said catch 20 will snap into the last one of the notches 18 or 18ᵃ under the action of the spring $f$. This will clear the pin 23 from engagement with the pin 22 and the wheel 24 will rapidly revolve until the pin 23 engages the opposite pin 22ᵃ on the opposite arm 21ᵃ of the tripping lever F. The train of gearing B will then come to a stop again, and during this movement the hammer 37 will have swung down striking the cap 38 on the plunger 39, and partially rotating the ratchet wheel 52, the parts then assuming the position shown in Fig. 2. Incident to this movement of the hammer 37 and wheel 52, the tooth 49 on the arm 47, will snap into one of the notches on the wheel 50 permitting the catch 45 to swing downward, when the spring 44 will force the friction wheel 43 into engagement with the friction wheel 61 and will rotate the printing roller 62, or the combined printing roller and visual scale 62ᵃ. The same movement of the wheel 50 will press the tooth 55 on the arm 53 out of engagement with the notch in the wheel 50, and will press the catch 57 at the end of said arm 53, out of engagement with the notch 58 in the heart-shaped cam 59, thus permitting the printing wheel 62 to revolve. The same movement of the wheel 50 will cause the tooth 66 on the bell crank 67 to ride along the top of the teeth on the wheel 50, then reaching the position shown in Fig. 2. A further movement of the tripping wheel 16 will cause the hook 20 of the tripping lever F to ride up on the portion 17ᵃ. This will release the pin 23 from engagement with the pin 22ᵃ and the wheel 24 will spin around, causing the parts B, and the striking lever 35, to return to the initial position shown in Fig. 1. At the same time, the wheels 43 and 61 will remain in engagement and the printing roller will continue to revolve. As soon as the tooth 20 enters the first one of the notches 18, the pin 22 will be thrown out of engagement with the pin 23, and the wheel 24 will revolve through another half revolution, causing the hammer 37 to strike the plunger 39, and this will turn the wheel 52 through another cog, causing the tooth 66 to snap into engagement with a notch of the wheel 50, and the spring 69 will throw the hammer 67 against the tape 68 and press the same against the carbon 76 and will print the corresponding number of the printing wheel on to the tape, and will hold the printing wheel 62 fast, preventing it from revolving. The same movement will throw the friction wheels 43 and 61 out of engagement, the parts then assuming the positions shown in Fig. 3. As the wheel 16 continues to revolve, the catch 20 will be pressed upward by the next tooth releasing the wheel 24, and returning the lever 35 to the initial position shown in Fig. 1, while the tooth 55 on the arm 53 will snap into engagement with one of the notches on the wheel 50, as shown in Fig. 4, and the catch 57 will bear eccentrically against the heart-shaped cam, as shown in dotted lines in Fig. 7, or in full lines in Fig. 4. This will cause the spring 56 to push the cam 59, and with it the wheel 62, around until the point 57 snaps into the notch 58 of the heart shaped cam 59, which position corresponds to the zero position of the printing wheel 62. This will restore the printing wheel to the zero position and the cycle of operation is complete. The last described movement of the bell crank 63 will drive the ratchet 73 slightly moving the typewriter ribbon 76, as will be obvious from inspection of Figs. 1 and 4. The movement of this bell crank 63 will also drive the plunger 80 and the friction wheels 86 and 87 which feed the tape through the apparatus, and promptly bring the reading just printed into view.

In order to provide for reading the indications on the wheel visually while the tape is being printed, the peep hole 90 may be provided in the casing, and an index 91 may be provided opposite the tape, as shown in Fig. 1, and two sets of graduations may be provided on the wheel, as indicated in Fig. 9, the one to print the record on the tape, the other to indicate the corresponding number that is being printed by the tape. For instance, if the index 91 be 180° from the tape 68, and the machine be set at zero, as is automatically accomplished by the mechanism already described, the right hand disk, shown in Fig. 9, would show visually the number of graduations through which the wheel 62ᵃ has been turned, while the corresponding number would be printed on the tape on the opposite side of the wheel from the graduations on the left side of the periphery of the wheel 62ᵃ.

It will be seen that the apparatus provides a timing mechanism driven at a regular speed, a striking mechanism controlled by said timing mechanism, a rotary scale, and means operated by the striking mechanism for intermittently causing said scale to rotate at a speed depending on the speed that is being measured; means for automatically returning said scale to the zero position, and means for printing the indicia on said scale on the moving tape, means for moving said tape, and also a printing ribbon, and means for moving the same, all actuated or controlled by the timing mechanism. All of these parts may be mounted in a small case located at any convenient point.

The printing wheel 62 or 62ᵃ as has been stated, is driven by the movement of the object whose speed it is desired to measure. If the moving object moves steadily, as for example, a marine engine, direct connection between the wheel E, and the moving object is desirable. If it is intermittent, as for example, the strokes of a pump, a ratchet connection may be used. If it is desired to measure speeds, when driven in a reverse direction, special gearing must be installed so that the wheel E may always be driven in the same direction. Further, the motion of the wheel 62 must be so geared down, that at the highest speed it is intended to record, the printing wheel 62 will not make more than one complete revolution during the interval between the time the tripping lever falls into the last notch before the blank space, and the time it falls into the first notch after the blank space. By having three notches, the last notch before the blank space, engaging the catch 20 causes the scale to rotate, and this rotation continues until the catch engages in the first notch after the blank space; then the scale is stopped and the distance the scale has traveled during this interval is stamped on the tape. When the hook 20 snaps into the second notch after the blank space, the scale is automatically restored to the zero point, and the tape is moved to show the stamped reading. This completes the cycle, and further motion of the catch to the third notch begins a new series of operations.

In case the instrument is some distance removed from the moving object whose speed it is designed to measure, the motion may be transmitted to the wheel E by suitable shafts and gearing or by the use of flexible shafting, such as employed to drive dentists' tools.

To measure the speed of moving vehicles, such as wagons, railway or tram cars, automobiles, etc., the wheel E may be driven by one of the wheels upon which the car travels, and the scale on the printing wheel may be graduated in the desired terms (say miles per hour) according to the linear circumference of the wheel engaged. This instrument is of particular use in measuring and recording the speed of marine engines of steam ships and men of war. The instrument may be located on the bridge, in the conning tower or at any other desired position, with the wheel E driven by the main shaft of the engine. The speed of the engine then is recorded and constantly placed in view.

It will be obvious that the herein described apparatus may be applied to a great variety of uses and that various changes may be made in the combinations and arrangements of parts which could be used without departing from the spirit of my invention.

Having thus described my invention, what I claim and desire to secure by Letters Patent of the United States is:

1. An apparatus of the character described, comprising a train of gearing arranged to run at uniform speed, striking mechanism intermittently controlled thereby, said mechanism including a pivoted striking arm and a hammer carried thereby, a rotary scale, means driven by the part whose speed is to be measured, for rotating said scale, and means operated by said striking mechanism for throwing said scale rotating means into and out of operation on the forward stroke of the hammer, substantially as described.

2. An apparatus of the character described, comprising a train of gearing arranged to run at uniform speed, striking mechanism intermittently controlled thereby, said mechanism including a pivoted striking arm and a hammer carried thereby, a rotary scale, means, driven by the part whose speed is to be measured for rotating said scale, and means operated by said striking mechanism for throwing said scale rotating means into and out of operation, which means are also controlled by said striking mechanism for restoring said scale to the initial position, substantially as described.

3. An apparatus of the character described, comprising a train of gearing arranged to run at uniform speed, striking mechanism intermittently controlled thereby, said mechanism including a pivoted striking arm and a hammer carried thereby, a rotary scale, means, driven by the part whose speed is to be measured, for rotating said scale, and means operated by said striking mechanism for throwing said scale rotating means into and out of operation, with means also controlled by said striking mechanism for indicating the movements of said scale, substantially as described.

4. An apparatus of the character described, comprising a train of gearing arranged to run at uniform speed, striking mechanism intermittently controlled thereby, said mechanism including a pivoted striking arm and a hammer carried thereby, a rotary scale, means, driven by the part whose speed is to be measured, for rotating said scale, and means operated by said striking mechanism for throwing said scale rotating means into and out of operation, means also controlled by said striking mechanism for restoring said scale to the initial position, and means also controlled by said striking mechanism for indicating the movements of said scale, substantially as described.

5. An apparatus of the character described, comprising a train of gearing arranged to run at uniform speed, striking mechanism intermittently controlled thereby, a rotary scale, means, driven by the part whose speed is to be measured, for rotating said scale, means operated by said striking mechanism for throwing said scale rotating means into and out of operation, and means also controlled by said striking mechanism for restoring said scale to the initial position, comprising a heart shaped cam mounted on the shaft of said rotary disk, and a spring impressed arm bearing on said heart shaped cam, substantially as described.

6. An apparatus of the character described, comprising a train of gearing arranged to run at uniform speed, striking mechanism intermittently controlled thereby, the said striking mechanism comprising a disk having a cylindrical surface provided with a group of three notches, a pivoted yoke having a hook at one end adapted to bear on said surface and to engage in said notches, and having its other end bifurcated, a pivoted hammer, a spring impressed train of gearing for driving said hammer, a pin projecting from one member of said train of gearing and adapted to engage alternately the two arms of the bifurcated end of said pivoted yoke; a rotary scale, means driven by the part whose speed is to be measured, for rotating said scale, and means operated by said striking mechanism for throwing said scale rotating means into and out of operation, substantially as described.

7. An apparatus of the character described, comprising a train of gearing arranged to run at uniform speed, striking mechanism intermittently controlled thereby, the said striking mechanism comprising a disk having a cylindrical surface provided with a group of three notches, a pivoted yoke having a hook at one end adapted to bear on said surface and to engage in said notches, and having its other end bifurcated, a pivoted hammer, a spring impressed train of gearing for driving said hammer, a pin projecting from one member of said train of gearing and adapted to engage alternately the two arms of the bifurcated end of said pivoted yoke; a rotary scale, means, driven by the part whose speed is to be measured for rotating said scale, and means operated by said striking mechanism for throwing said scale rotating means into and out of operation, said means being also controlled by said striking mechanism for restoring said scale to the initial position, substantially as described.

8. An apparatus of the character described, comprising a train of gearing arranged to run at uniform speed, striking mechanism intermittently controlled thereby, the said striking mechanism comprising a disk having a cylindrical surface provided with a group of three notches, a pivoted yoke having a hook at one end adapted to bear on said surface and to engage in said notches, and having its other end bifurcated, a pivoted hammer, a spring impressed train of gearing for driving said hammer, a pin projecting from one member of said train of gearing and adapted to engage alternately the two arms of the bifurcated end of said pivoted yoke; a rotary scale, means, driven by the part whose speed is to be measured, for rotating said scale, and means operated by said striking mechanism for throwing said scale rotating means into and out of operation, with means also controlled by said striking mechanism for indicating the movements of said scale, substantially as described.

9. An apparatus of the character described, comprising a train of gearing arranged to run at uniform speed, striking mechanism intermittently controlled thereby, the said striking mechanism comprising a disk having a cylindrical surface provided with a group of three notches, a pivoted yoke having a hook at one end adapted to bear on said surface and to engage in said notches, and having its other end bifurcated, a pivoted hammer, a spring impressed train of gearing for driving said hammer, a pin projecting from one member of said train of gearing and adapted to engage alternately the two arms of the bifurcated end of said pivoted yoke; a rotary scale, means, driven by the part whose speed is to be measured, for rotating said scale, and means operated by said striking mechanism for throwing said scale rotating means into and out of operation, means also controlled by said striking mechanism for restoring said scale to the initial position, and means also controlled by said striking mechanism for indicating the movements of said scale, substantially as described.

10. An apparatus of the character described, comprising a train of gearing arranged to run at uniform speed, striking mechanism intermittently controlled thereby, the said striking mechanism comprising a disk having a cylindrical surface provided with a group of three notches, a pivoted yoke having a hook at one end adapted to bear on said surface and to engage in said notches, and having its other end bifurcated, a pivoted hammer, a spring impressed train of gearing for driving said hammer, a pin projecting from one member of said train of gearing and adapted to engage alternately the two arms of the bifurcated end of said pivoted yoke; a rotary scale, means, driven by the part whose speed is to be measured, for rotating said scale, means operated by said striking mechanism for throwing said scale rotating means into and out of operation, and means also controlled by said striking mechanism for restoring said scale to the initial position, comprising a heart shaped cam mounted on the shaft of said rotary disk, and a spring impressed arm bearing on said heart shaped cam, substantially as described.

In testimony whereof, I affix my signature, in presence of two witnesses.

RICHARD DRACE WHITE.

Witnesses:
  JOSEPH S. HUNT,
  A. D. WEEKES, Jr.